United States Patent

[11] 3,555,278

| [72] | Inventor | Gerald L. Schroeder<br>Brookline, Mass. |
|---|---|---|
| [21] | Appl. No. | 784,720 |
| [22] | Filed | Dec. 18, 1968 |
| [45] | Patented | Jan. 12, 1971 |
| [73] | Assignee | The United States of America as represented by the United States Atomic Energy Commission |

[54] POTENTIAL ALPHA RAY ACTIVITY METER
6 Claims, 1 Drawing Fig.

[52] U.S. Cl................................................. 250/83.3,
250/83.6
[51] Int. Cl................................................... G01t 1/16,
G01t 1/20, G01t 7/04
[50] Field of Search........................................ 250/43.5R,
83.6FT, 83.3

[56] References Cited
UNITED STATES PATENTS
| 3,109,096 | 10/1963 | Spaa.......................... | 250/83.6FT |
| 3,339,070 | 8/1967 | Main.......................... | 250/83.6FT |

*Primary Examiner*—Archie R. Borchelt
*Attorney*—Roland A. Anderson

ABSTRACT: Method and apparatus for measuring the potential alpha ray activity of a gas sample containing a gaseous component such as Rn having solid short-lived daughter products some of whom are alpha ray emitters. The apparatus collects on a filter the particulate of the solid daughter products over a finite period of time and measures separately the alpha and the beta-gamma activities. The portion of the latter which results in short-lived daughter products producing alpha energy is separated out and added to the alpha activity measured.

PATENTED JAN 12 1971
3,555,278
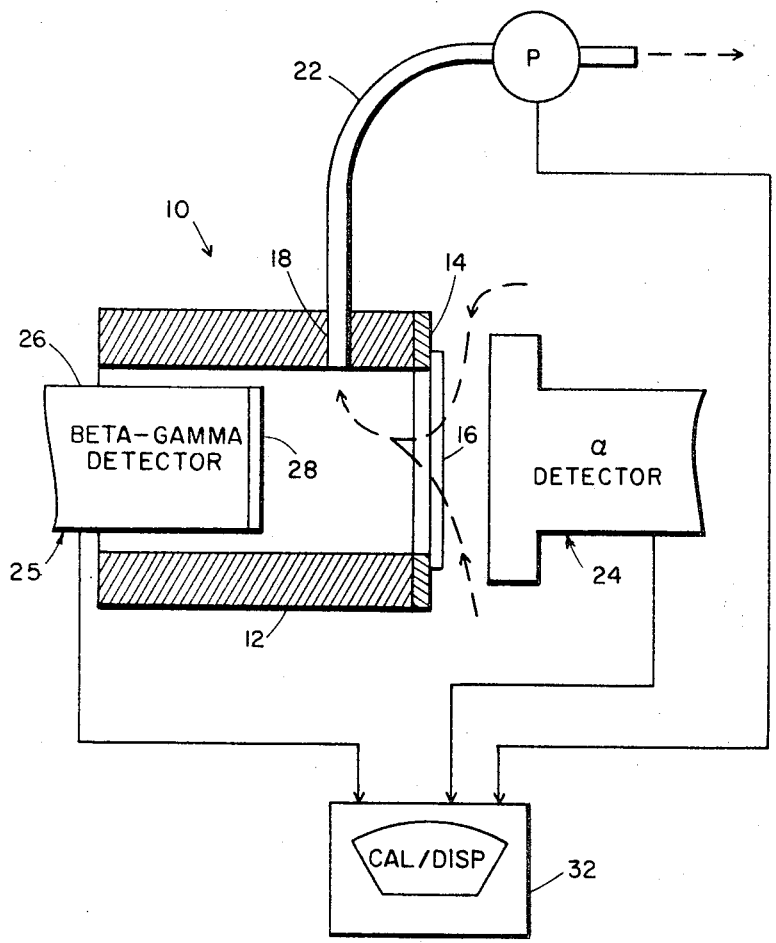
INVENTOR.
GERALD L. SCHROEDER
BY

POTENTIAL ALPHA RAY ACTIVITY METER

BACKGROUND OF THE INVENTION

The invention described herein was made in the course of, or under a contract with the United States Atomic Energy Commission.

In uranium mines and other mine shafts where there is a natural concentration of radium, there is ordinarily present in sufficient concentration to constitute a health hazard the first daughter products radon (Rn), the most commonly occurring isotope being $Rn^{222}$ from $Ra^{226}$. The health hazard arises from the short-lived solid daughter products of Rn which provide potential alpha ray energy exposure to the lung when airborne in an atmosphere which may be breathed. For purposes of this invention, the short-lived daughter products are defined as those decay products which have a half-life of up to a few days, and in the case of Rn, the particular daughter products described below. By potential alpha ray energy is meant the total alpha energy emitted by existing nucleii plus that which will be emitted by successive short-lived daughter products. Thus, nuclide RaA ($Po^{218}$), the first daughter product of $Rn^{222}$, decays in sequence to RaB ($Pb^{214}$) emitting alpha energy of 6.00 mev. to RaC ($Bi^{214}$) emitting beta energy, to RaC' ($Po^{214}$) emitting beta energy, and finally to $Pb^{210}$ with the emission of 7.68 mev. of alpha energy. The potential alpha energy of RaA would be the sum of 6.00 and 7.68 mev. for each nuclide present of the first daughter product. Since Rn is a gas it does not represent the health hazard to the lungs in the quantities present as the concern is that of alpha emitters which can be deposited out on the surfaces within the lungs.

For convenience, total potential alpha energy is measured on an air volume basis in units of working levels (WL). One WL equals $1.3 \times 10^5$ mev. potential alpha energy from short-lived daughter products per liter.

The control of working levels (WL) in mine atmospheres is fundamentally related to the understanding of the sources and distribution of the various Rn daughter products. Present methods of measuring these nuclides with other than fixed position, continuous air monitors, are limited to taking grab samples of the air or filtering known volumes of air for daughter products. In both cases the samples are analyzed at some other location.

The present method of measuring WL on site of the daughter products of Rn requires a 45-minute equalization period. However, the delay in obtaining the answer greatly hinders ventilation personnel in understanding and controlling sources of contaminated air within a mine. In all field work it is desirable to obtain the final data sought as rapidly as possible and without the necessity of going elsewhere for sample analysis.

SUMMARY OF THE INVENTION

The present invention makes it possible to obtain almost instantly, on location, a direct reading of potential alpha ray energy in terms of WL. In accordance with this invention air containing Rn is drawn through a filter at a fixed rate for a fixed period of time for a relatively short duration of time. The filter during pumping is located in fixed and reproducible geometry between an alpha ray detector and a plastic scintillator for beta and gamma counting. The alpha counting is grouped into separate channels corresponding to the energy levels associated with particular short-lived daughter products while the beta and gamma counting is grouped in a single channel.

This type of a separation makes it possible to weigh the alpha rates in terms of instrument efficiency and number of atoms present to produce the measured energy and combine the values with the beta and gamma energies weighted according to efficiency and converted into number of atoms present whose subsequent short-lived daughter products will produce alpha ray energy. As each nuclide has a particular potential mev. of alpha energy (or contribution to WL) per atom, it is possible in accordance with this invention to obtain the desired information without accumulating data during and beyond the whole period it takes for all the short-lived daughter products to disintegrate.

It is thus seen that there has been provided a unique way of measuring rapidly potential alpha ray energy present in an atmospheric environment.

Other objects and advantages of this invention will become readily apparent from the following description of a preferred embodiment of this invention given with reference to the accompanying drawing.

BRIEF DESCRIPTION OF THE DRAWING

The FIG. shows schematically a preferred embodiment of this invention.

DESCRIPTION OF THE PREFERRED EMBODIMENT

Referring to the FIG., instant working level meter 10 consists of an open ended cylindrical member 12 against one end of which is mounted a filter planchet 14 which is annular in shape as illustrated on which is mounted a filter element 16 which in this embodiment is a strip of filter paper. Filter paper 16 may be held in place by tape or by clamping and for the particular application described about an 0.8 micron size paper is preferred. If a paper of smaller passage size is selected the pressure drop is greater while a larger passage size permits too great a penetration as will be later described. Pore size must be such as to cause substantially complete deposition along the outer surface of the paper, for reasons to be later explained.

Cylindrical member 12 is provided with a passageway 18 into which a tube 22 extends from the vacuum side of an air pump P. On the side of planchet 14 facing away from cylindrical member 12 is an $\alpha$-ray detector 24 spaced a short distance from filter paper 16. Within member 12 is a beta, gamma counter 25 consisting of a photomultiplier tube 26 which with a sheet 28 of suitable scintillating material. When pump P is operating air will flow through filter 16 and tube 22 in the manner shown by the broken line arrows illustrated. Counters 24 and 25 are located on opposite sides of filter paper 16 to obtain stable and dependable readings with improved accuracy and reliability.

Filter paper 16 is selected for a hole size not to exceed a value such that the particles of the nuclides of interest to be collected are substantially all collected on the outside of filter paper 16 rather than penetrating the filter paper. If the pores are too large and some of the alpha emitting particles are collected within the paper itself rather than along the outside surface of the paper, then some of the alpha radiation will be absorbed by the paper and not reach alpha detector 24. Alpha ray detector 24 will then record substantially all of the alpha rays while photomultiplier tube 26, not being sensitive to the $\alpha$ rays, records only the beta and gamma rays.

A calculating and display device 32 receives the information developed by detectors 24 and 25 and air volumetric flow from pump P and indicates directly the potential alpha ray activity or energy in terms of WL as hereinafter explained.

In the operation of meter 10, pump P is operated at a constant rate so that after a given period of time, such as 2 minutes, exact information is available as to how much air was sampled from which the particulate size was collected on filter paper 16.

During the sampling period, calculating and display device 32 integrates the total of beta and gamma radiation from detector 25 and alpha radiation from detector 24. By combining the readings obtained from detectors 25 and 26 in a way depending on the nature of the daughter products it is possible to obtain a direct reading on device 32 of the potential alpha ray energy in WL.

By way of example, in a mine location where there is a natural concentration of radium, there is a potential health hazard from alpha rays emanating from the short-lived daughter products of Rn. Referring to Table I, these short-lived daughter products are identified in terms of a particular sample of air found in a mine shaft containing 100 pCi/l of radon in equilibrium. The term pCi means pico curie which is equivalent to $10^{-12}$ curies, or 2.22 disintegrations per minute.

TABLE 1

| Nuclide | α-Ray energy, mev. | Half-period | Activity, pCi/l. | Number of atoms per 100 pCi | Potential α-ray energy per atom, mev. | Total potential α-ray energy, mev./100 pCi | Percent of totals |
|---|---|---|---|---|---|---|---|
| Rn(Rn$^{222}$) | 5.49 | 3.825 days | 100 | 1.77×10$^6$ | (1) | (1) | (1) |
| RaA(Po$^{218}$) | 6.00 | 3.05 minutes | 100 | 977 | 6.00+7.68 | 0.134×10$^5$ | 10 |
| RaB(Pb$^{214}$) | 0 | 26.8 minutes | 100 | 8,580 | 7.68 | 0.659×10$^5$ | 52 |
| RaC(Bi$^{214}$) | 0 | 19.7 minutes | 100 | 6,310 | 7.68 | 0.485×10$^5$ | 38 |
| RaC'(Po$^{214}$) | 7.68 | 10$^{-7}$ minutes | 100 | ~10$^{-3}$ | 7.68 | 0.000×10$^5$ | 0 |
| Total | | | | | | 1.278×10$^5$ | 100 |

$^1$ Not included.

It will be seen from table 1 that the short-lived daughter products identified as RaA, RaB, RaC, and RaC' do not all emit alpha rays. Nuclides RaB and RaC emit beta rays but these nuclides are potential alpha emitters because they eventually produce RaC' which is an alpha emitter. From the number of atoms present in the sample for each nuclide the total potential α-ray energy is readily determined for each nuclide and then summed to obtain the total. It is readily evident that in such a sample taken and accumulated for a particular period of time such as 2 minutes the makeup of the sample will change due to the disintegrations taking place. Provided the daughter products are identified or known it is readily apparent that in a specified period of time the operator will know the makeup of the sample at the beginning of the sampling process.

In order to have device 32 display the potential alpha activity, detector 25 produces the total beta gamma activity from RaB, RaC, and background while alpha detector 14 in two separate channels (6.0 mev. and 7.68 mev.), respectively, produces the alpha activity from RaA and RaC'. Background is measured directly by operating meter 10 without filtering air. By half-period considerations it is seen that activity of RaC' equals activity of RaC, that is, due to the very short half-life of RaC' the number of disintegrations of the latter indicate the number of atoms present of RaC. Hence, by subtracting the background beta and gamma activity and the activity of RaC' taken from detector 24 from the sum recorded by detector 26, the activity of RaB is known and hence its potential alpha activity. Activity is the number of disintegrations per unit time. For a given nuclide this is directly proportional to the number of atoms present and inversely proportional to its half-period. Device 32 is calibrated to weigh each indication according to number of atoms present for each nuclide, to take into account the differing detection efficiencies of detectors 24 and 25, adding and subtracting these factors as described and reading directly the results in terms of WL.

While only a preferred embodiment of the invention has been described it is understood that the invention is defined only by the scope of the following claims.

I claim:

1. Apparatus for measuring potential alpha ray activity in a gas sample comprising:
    a. stationary filter means for collecting along one outer surface thereof the particulate contained within said gas sample;
    b. means for pumping said gas sample through said filter means;
    c. means facing said outer surface for measuring and integrating during collection the actual alpha ray activity of the particulate collected on said filter means;
    d. means for measuring and integrating during collection the beta and gamma ray activity of the particulate collected on said filter means; and
    e. means for adding each component of said beta and gamma ray activity emitted by a short-lived nuclide having an alpha emitting daughter product to the measured alpha ray activity to obtain the potential alpha ray activity of said gas sample.

2. The apparatus of claim 1 in which said filter means includes a filter element whose pore openings are sufficiently small to insure that substantially all of the particulate expected to be trapped will accumulate along the outer surface of said filter element.

3. The apparatus of claim 2 in which the beta and gamma ray measuring means is located on the side of said filter element opposite the collecting surface.

4. The method of measuring potential alpha ray activity of a gas containing Rn comprising the steps of:
    a. passing a measured sample of said gas through a filter whose pore size is sufficiently fine to collect substantially all particulate of the short-lived daughter products of said Rn along the outer surfaces thereof;
    b. measuring during flow of said gas through said filter the total alpha activity in separate channels corresponding to the alpha activities of the daughter products RaA and RaC' from the collected particulate;
    c. measuring separately during flow of said gas through said filter the total beta and gamma emission from said particulate;
    d. subtracting the activity of the daughter product RaC' from the total beta and gamma activity to obtain the activity due to the daughter product RaB; and
    e. adding the activity due to RaB to that of RaA and RaC' to obtain the potential alpha activity of said gas.

5. The method of claim 4 in which background beta and gamma activity is measured prior to passing said measured sample through said filter and thereafter subtracting the background activity from the beta and gamma activity measured from said sample.

6. The method of claim 5 in which the alpha and the beta and gamma measurements are taken from opposite faces of said filter.